May 31, 1966  G. B. RABE  3,253,842
SHEAR KEY JOINT

Filed Dec. 10, 1963  2 Sheets-Sheet 1

INVENTOR.
GEORGE B. RABE
BY
AGENT

May 31, 1966  G. B. RABE  3,253,842
SHEAR KEY JOINT

Filed Dec. 10, 1963  2 Sheets-Sheet 2

INVENTOR.
GEORGE B. RABE
BY
*William R. Wright*
AGENT

United States Patent Office 3,253,842
Patented May 31, 1966

3,253,842
SHEAR KEY JOINT
George B. Rabe, Sparta, N.J., assignor to Thiokol Chemical Corporation, Bristol, Pa., a corporation of Delaware
Filed Dec. 10, 1963, Ser. No. 329,552
7 Claims. (Cl. 285—81)

This invention relates generally to joints and more particularly to a joint formed of novel co-operating elements which connect the adjacent edges or ends of two members to be joined together.

One of the problems encountered in designing cases for solid propellant rocket engines has been the difficulty of designing a suitable joint for fastening or connecting the separable aft closure to the engine. An ideal joint for this as well as other applications must be light in weight, reliable and easily assembled.

Insofar as is known, available joints gained reliability only at the expense of weight penalties. Because of the ever increasing size of solid propellant rocket engines which must therefore be fabricated in segments to be assembled in abutting, axial alignment, such weight problems become even more pronounced due to the increased number and larger size of joints required for a single engine. Also, known joints are usually difficult to assemble and their parts have not been interchangeable, making them unsuitable for use in a segmented engine. Thus, the use of available joints in segmented rocket engines involves prohibitive weight penalties and assembly problems.

Accordingly, the main object of the present invention is to provide an improved joint for various types of members or segments thereof which will obviate the above and other disadvantages characterizing known joints.

An important object of the present invention is to provide an improved joint for members or segments thereof which is interchangeable, lightweight, reliable, and readily assembled or disassembled.

Another important object of the present invention is to provided an improved joint which is particularly suitable for use in joining large rocket engine segments together and which will not be subject to or affected by the hot combustion gases therein.

A further important object of the present invention is to provide an improved joint in which fabrication tolerances can be relaxed to a degree and which will embody adequate joint strength.

Another object of the present invention is to provide an improved joint which is simple and practical in construction, strong, rugged and of long life in use, and susceptible of ready and economic manufacture.

Other objects and advantages of the invention will become apparent during the course of the following description.

In its broadest aspects, the invention contemplates the provision of a plurality of interfitting, co-operating members formed in or attached to the adjacent edges of two members to be joined and a plurality of elements which maintain the members in co-operating relationship.

In the drawings I have shown one embodiment of the invention. In this showing:

Figure 1:
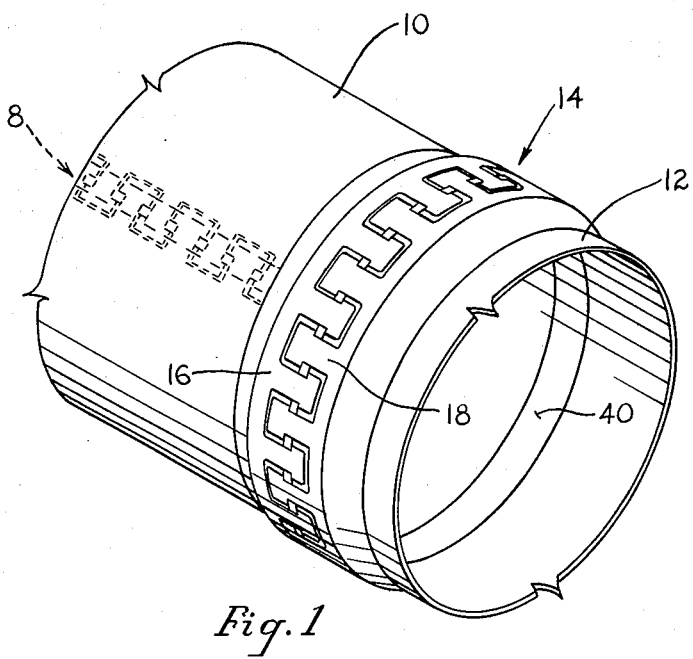
FIGURE 1 is a perspective view of the joint comprising the invention connecting two cylindrical segments.

Referring to the drawings, numerals 10 and 12 designate two cylindrical members whose adjacent ends are to be joined. For reasons which will appear, the invention is applicable to cylindrical members, to arcuate members which are more than semi-circular in cross-section, to the ends of a resilient, cylinder-forming member as suggested by the joint 8 shown in dotted lines in FIGURE 1, and to any pair of members which are retained in a coplanar position.

Figure 2:
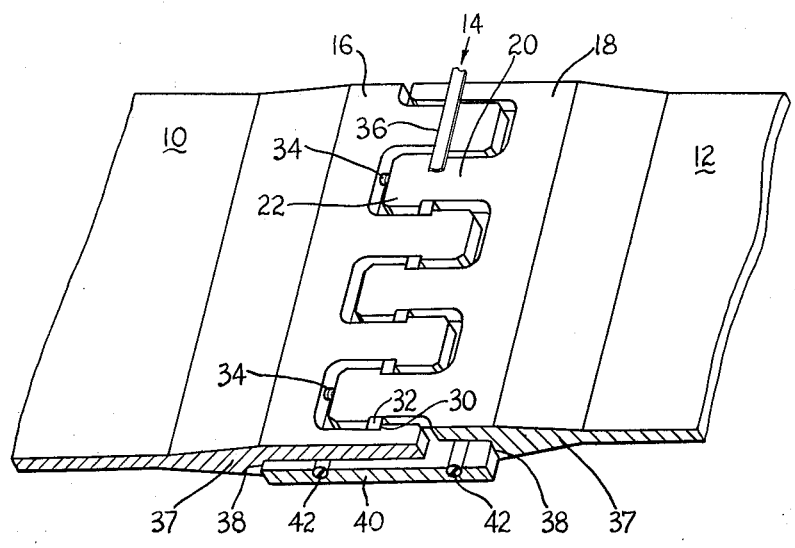
FIGURE 2 is a fragmentary perspective view thereof to an enlarged scale.

The joint 14, comprising the present invention, includes a pair of identical, oppositely disposed members 16 and 18 which may be the adjacent ends of the cylindrical members 10 and 12 (FIGURES 1–3) or separate members attached to the ends (FIGURE 4) as by welding.

The adjacent ends of the members are machined to produce a plurality of longitudinally extending, T-shaped fingers 20 having heads 22 defined by their shoulders 24. The fingers are equally spaced circumferentially about the cylindrical members or segments 10 and 12 to define large spaces or slots 26 opening onto smaller slots or spaces 28 of greater width than the adjacent finger heads 22. Thus the heads 22 of the T-shaped fingers 20 of one of the members 16, 18 can be slipped through the spaces 28 into the spaces 26 of the other member.

It will be readily apparent (FIGURE 2) that when the T-shaped fingers 20 of one member 16, 18 are fully inserted into the slots of the other, that the shoulders 24 of the finger heads 22 define generally rectangular, radially disposed recesses or spaces 30. A plurality of rectangular keys 32 are inserted into these spaces 30 to engage the shoulders and maintain the members 16 and 18 and their T-shaped fingers in interlocked relationship. In order to provide good contact between the fingers 20 and their mating shoulders 24, thus eliminating clearance and resultant shock stresses, a plurality of longitudinally disposed jackscrews 34 are provided in the base of the large slots 26.

When the keys 32 have been inserted, the jackscrews 34 are rotated to bear against the adjacent finger head 22 and displace one set of fingers 20 with respect to the others until all of the keys and shoulders are in firm engagement with each other. A key retaining band 36 is applied and suitably fastened around the outer periphery of the keys 32 (FIGURE 2) to secure them radially after the proper adjustments have been made to secure them longitudinally.

Figure 3:
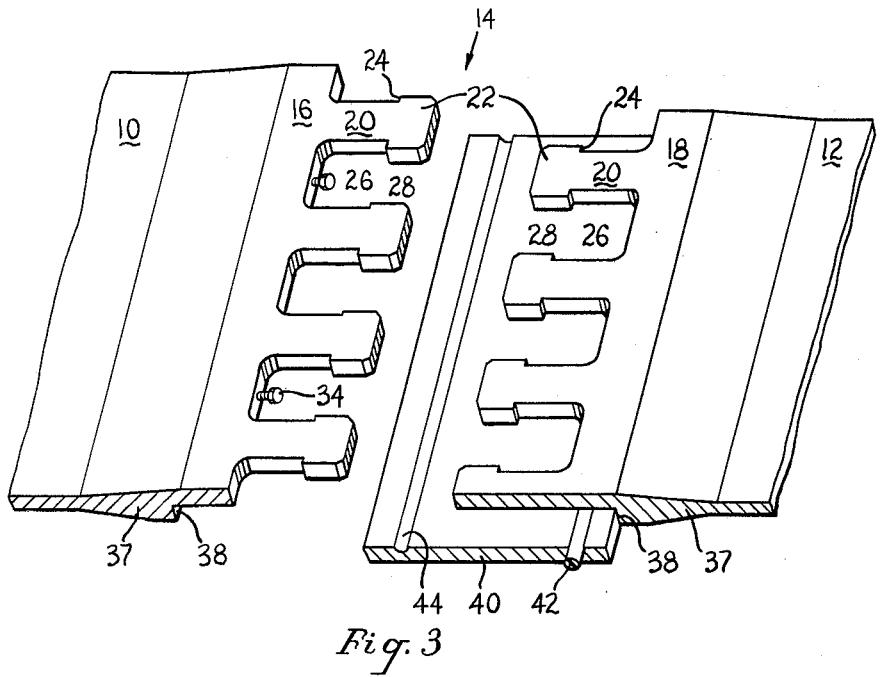
FIGURE 3 is a similar view showing the invention in unjoined position.
Figure 4:
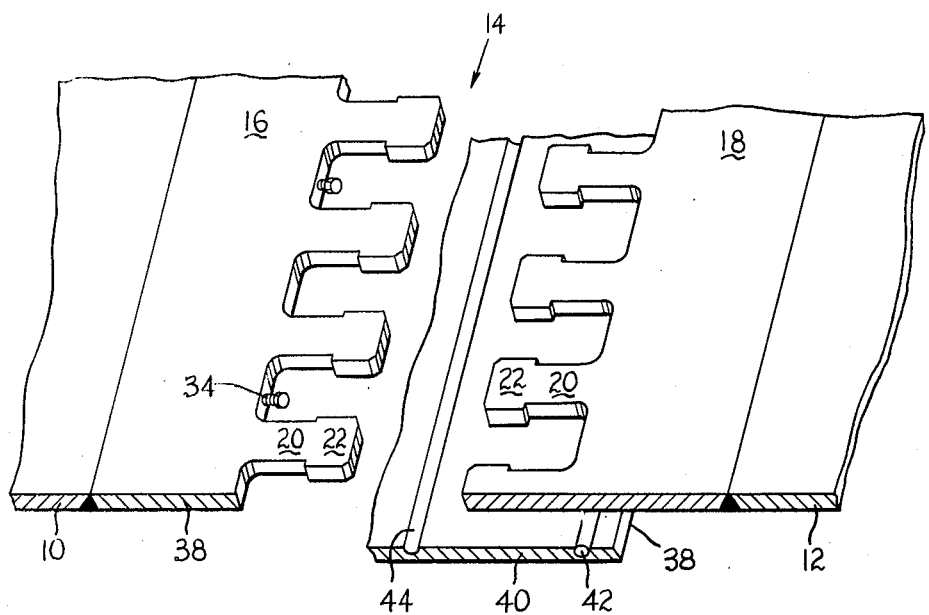
FIGURE 4 is a view similar to FIGURE 3 showing the invention attached to rather than being formed as an integral part of two members or segments to be joined.

As seen in FIGURE 3, the members 16 and 18 are thickened as at 37 to provide adequate joint strength and the thickened portions terminate in shoulders 38 formed on their lower surfaces. In FIGURE 4, the shoulders 38 are formed by the ends of the members 10 and 12. In order to provide hoop strength to the joint 14, a member or cylindrical ring 40 is positioned adjacent to the joint and against the interior surface of the members 16 and 18 and in such position, abuts the spaced shoulders 38 and transmits the load thereto. The cylindrical ring or member 40 is provided with O-rings 42 seated in circumferentially extending grooves 44 to seal the joint 14 from the hot combustion gases during operation of the rocket engine.

In addition to the features set forth hereinbefore, it will be appreciated that fabrication tolerances can be relaxed to a degree since lateral clearance is required between the interlocking fingers 20.

It is to be understood that the form of my invention herewith shown and described is to be taken as a preferred example of the same and that various changes in the shape, size and arrangement of parts may be resorted to without departure from the spirit of the invention or the scope of the subjoined claims.

I claim:

1. A joint for connecting two members together comprising, in combination, a pair of members, a plurality of spaced fingers including heads formed in the adjacent ends of each of the members, the fingers of each of said members being interfittably insertable in the spaces of the other of said members to join the members, means co-operating with adjacent interfitting fingers and preventing retraction thereof from said spaces, said fingers being T-shaped and said means comprising keys slidably insertable between the heads of adjacent fingers, jackscrews acting axially of said fingers against said heads to tightly clamp all of said heads and said keys together, a shoulder formed in the lower surface of each of said adjacent ends, and a member engaging the entire length of said shoulders and transmitting the compressive joint load therebetween.

2. The combination recited in claim 1, and means comprising a band engaging and retaining said keys between said finger heads.

3. The combination recited in claim 1, and a seal mounted between said engaging member and said lower surfaces to prevent leakage therebetween.

4. A joint for connecting two cylindrical segments together comprising, in combination, a pair of cylindrical members forming the adjacent ends of the segments, a plurality of circumferentially spaced fingers formed in said adjacent ends of the members, the fingers of each of said members being interfittably insertable in the spaces of the other of said members upon movement of the members into abutting joined relationship, means co-operating with adjacent interfitting fingers and locking them and said members together, said fingers being T-shaped and including shoulders defining openings with adjacent shoulders where said members are in abutting relationship and said cooperating means comprising keys slidably insertable in said openings against said shoulders, jackscrews acting axially of said members against said fingers to tightly clamp all of said heads and said keys together, a shoulder formed in the lower surface of each of said members, and a cylindrical ring engaging said shoulders to transmit the compressive joint load therebetween and maintain a tight joint.

5. The combination recited in claim 4, and a seal mounted between said ring and said lower surfaces to prevent leakage therebetween.

6. A joint for connecting two cylindrical segments together comprising, in combination, a pair of cylindrical members forming the adjacent ends of the segments, a plurality of circumferentially spaced fingers formed in said adjacent ends of the members, the fingers of each of said members being interfittably insertable in the spaces of the other of said members upon movement of the members into abutting joined relationship, means co-operating with adjacent interfitting fingers and locking them and said members together, said fingers being T-shaped and including shoulders defining openings with adjacent shoulders where said members are in abutting relationship and said cooperating means comprising keys slidably insertable in said openings against said shoulders, a shoulder formed in the lower surface of each of said members, a cylindrical ring engaging said lower surfaces and extending between and engaging said shoulders to transmit the compressive joint load therebetween and maintain a tight joint, and means comprising a circumferentially extending band engaging and retaining said keys between said shoulders of said T-shaped fingers.

7. The combination recited in claim 6, and a seal mounted between said ring and said lower surfaces to prevent leakage therebetween.

References Cited by the Examiner

UNITED STATES PATENTS

| | | | |
|---|---|---|---|
| 967,395 | 8/1910 | Langhaar | 285—330 X |
| 1,969,531 | 8/1934 | Swedler | 285—92 X |
| 2,417,195 | 3/1947 | Hargreaves | 285—330 X |
| 2,553,220 | 5/1951 | Troeger | 285—330 X |
| 3,148,897 | 9/1964 | Hurt | 285—404 X |

FOREIGN PATENTS 914,803  7/1954  Germany.

CARL W. TOMLIN, *Primary Examiner.*

R. GIANGIORGI, *Assistant Examiner.*